US012641096B2

(12) United States Patent
Butts et al.

(10) Patent No.: US 12,641,096 B2
(45) Date of Patent: May 26, 2026

(54) NODE ENTITLEMENT AND ACCESS RISK SCORING

(71) Applicant: U.S. Bank National Association, Minneapolis, MN (US)

(72) Inventors: Bradley V. Butts, Mason, OH (US); Ivko I. Cvejic, Huntingdon Valley, PA (US); Charles C. Zhou, Columbus, OH (US)

(73) Assignee: U.S. Bank National Association, Minneapolis, MN (US)

( * ) Notice: Subject to any disclaimer, the term of this patent is extended or adjusted under 35 U.S.C. 154(b) by 7 days.

(21) Appl. No.: 18/781,069

(22) Filed: Jul. 23, 2024

(65) Prior Publication Data

US 2026/0032129 A1 Jan. 29, 2026

(51) Int. Cl.
*H04L 9/40* (2022.01)
(52) U.S. Cl.
CPC ...... *H04L 63/1416* (2013.01); *H04L 63/1433* (2013.01)
(58) Field of Classification Search
CPC .................. H04L 63/1416; H04L 63/1433
See application file for complete search history.

(56) References Cited

U.S. PATENT DOCUMENTS

| | | | |
|---|---|---|---|
| 11,568,455 B2 | 1/2023 | Hogg et al. | |
| 12,120,150 B2 * | 10/2024 | Lin .................... | H04L 63/1416 |

| | | | |
|---|---|---|---|
| 2007/0239495 A1 | 10/2007 | Osborn et al. | |
| 2013/0091574 A1 * | 4/2013 | Howes .................. | G06F 21/554 |
| | | | 726/25 |
| 2017/0364849 A1 | 12/2017 | Glotz et al. | |
| 2018/0308026 A1 | 10/2018 | Sinha et al. | |
| 2018/0365439 A1 | 12/2018 | Milman et al. | |
| 2021/0004878 A1 | 1/2021 | Hogg et al. | |
| 2021/0185084 A1 * | 6/2021 | Sodja ..................... | H04L 63/20 |
| 2024/0244075 A1 * | 7/2024 | Yarabolu ............. | H04L 63/1433 |
| 2025/0220038 A1 * | 7/2025 | Yarabolu ............. | H04L 63/1425 |

FOREIGN PATENT DOCUMENTS

CN          117574399 A          2/2024

OTHER PUBLICATIONS

Parkinson, Simon et al., "Creeper: a tool for detecting permission creep in file system access controls", Cybersecurity (2019) 2; 14 pages.

* cited by examiner

*Primary Examiner* — Simon P Kanaan
(74) *Attorney, Agent, or Firm* — Merchant & Gould P.C.

(57)          ABSTRACT

High risk nodes in a network are identified and remediated. Inherent risk scores are summed for entitlements of each node, resulting in an entitlement risk score sum for each node. For each peer group, a mean inherent risk score total and a standard deviation are calculated based on these sums. A metric representing the number of peer group standard deviations for each node from the peer group mean inherent score total is generated. This metric is then transformed onto a scale using a cumulative distribution function to generate a threat score for each node corresponding to all the entitlements. The nodes can be rank-ordered based on their threat scores to prioritize risk assessment analysis and remediation.

20 Claims, 7 Drawing Sheets

300

| Software Name 502 | CAR ID 504 | Software Status 506 | Inherent Risk Rating 508 | Information Classification 510 | Inherent Risk Score 512 |
|---|---|---|---|---|---|
| Application A1 | 2342 | Active | Very High | Personal | 59 |
| Application A2 | 364543 | Inactive | High | N/A | N/A |
| Application A3 | 656 | Active | Moderate | Personal | 55 |
| Application A4 | 78 | Active | Moderate | Public | 42 |
| Application A5 | 344 | Inactive | Low | Confidential | 77 |
| Application A6 | 5690 | Active | Low | N/A | 87 |
| Application A7 | 1765 | Inactive | Not Rated | N/A | N/A |
| Application A8 | 346 | Under Maintenance | Low | Public | 46 |

FIG. 5A

| Node ID 522 | Entitlements 524 | Precalculated IRS Risk Score 526 | Organizational Dataset Group Mapping 528 | Entitled Applications IRS Sum 530 | Mean IRS Score Total 532 | Peer Group Standard Deviation 534 | Metric 536 | Threat Score 538 | Rank Order 540 |
|---|---|---|---|---|---|---|---|---|---|
| Node x | A1, A2 | 0.8 | {Role A, Peer Group 1} | 2.2 | 1.9 | {PG 1, 0.3} | 1.0 | 0.841 | 4 |
| Node y | A2, A3 | 0.6 | {Role B, Peer Group 1} | 1.8 | 1.75 | {PG 1, 0.3} | 3.0 | 0.977 | 5 |
| Node z | A3 | 0.7 | {Role A, Peer Group 1} {Role A, Peer Group 2} | 2.2 | 1.9 | {PG 1, 0.3} {PG 2, 0.0} | 1.0 0.0 | 0.689 | 3 |
| Node a | A1 | 0.4 | {Role C, Peer Group 2} | 0.9 | 0.9 | {PG 2, 0.0} | 0.0 | 0.5 | 2 |
| Node b | A2 | 0.9 | {Role D, Peer Group 2} | 3.4 | 3.4 | {PG 2, 0.0} | 0.0 | 0.0 | 1 |

FIG. 5B

NODE ENTITLEMENT AND ACCESS RISK SCORING

TECHNICAL FIELD

The present disclosure relates generally to cyber security, and more particularly to providing continuous entitlement and access risk scoring of nodes within an organization network and applying the risk scores to information security control systems.

BACKGROUND

In the context of an organization, a node refers to any addressable device, endpoint, or even an account associated with an individual within its network that can interact with other devices, systems, applications or users. These nodes can be subject to cyber attacks, making them critical points of vulnerability that need robust security measures. Workstations, laptops and the applications executed thereon are the most common endpoints used by employees. They are often targeted through phishing attacks, malware, and ransomware. Servers store and manage critical data and applications. Attacks on servers can lead to data breaches, service disruptions, and unauthorized access to sensitive information. Network Devices such as routers, switches, and firewalls, are integral to network infrastructure. Compromising these devices can allow attackers to intercept, manipulate, or reroute network traffic.

Mobile Devices such as smartphones and tablets used within the organization can be vulnerable to mobile-specific threats like malicious applications and insecure Wi-Fi connections.

Internet of Things (IoT) Devices such as smart cameras, sensors, and other connected gadgets can be targeted due to often having weaker security measures and difficulty in applying security updates. Printers and other peripherals can be overlooked but may contain vulnerabilities that allow attackers to access network resources or data stored on these devices. Cloud services and storage are sometimes used by the organization that are hosted in the cloud. Attacks on cloud services can compromise data integrity, availability, and confidentiality. Even individuals such as employees, contractors, and other users with access to the organization's systems, applications, and data can be exploited through social engineering attacks, phishing, and other tactics that target human vulnerabilities to gain unauthorized access. Ensuring the security of these nodes involves implementing comprehensive cybersecurity strategies, including regular updates, patches, network monitoring, access controls (including physical and virtual access controls), and management of resources for employees.

Entitlement management involves controlling and managing the permissions and access rights of various nodes within a network. This includes ensuring that each device, endpoint, or individual account has the appropriate level of access based on their role and responsibilities. It involves determining what resources, systems, and data an individual (e.g., employee or contractor) is authorized to access and perform actions on. Entitlements can include specific user privileges, roles, or permissions that allow individuals to carry out their job responsibilities effectively.

A goal of entitlement management can be to ensure that nodes have access to the resources and information necessary for their roles, while also resisting unauthorized access to sensitive data. It involves defining and assigning entitlements based on job roles, responsibilities, and the principle of least privilege, which means granting nodes the minimum level of access required to perform their tasks.

One example area of concern involving entitlement management is where nodes retain old entitlements that are no longer necessary when they transition to different roles. This issue is further compounded by the difficulty of comparing entitlement profiles among nodes and the potential for cryptically named entitlements to go unnoticed.

Currently, some organizations heavily rely on periodic (e.g., quarterly) reviews of nodes to identify and address entitlement-related risks. However, this process can be cumbersome and inefficient for several reasons. Entitlements may be poorly named, and the nodes themselves are not configured to recognized which entitlements are relevant to their tasks. In the case where a node is an individual, the individual may simply not be aware of which entitlements are relevant to their tasks. In addition, reviewing entitlements manually often entails scrolling through extensive lists, and comparing one entitlement profile of a node to the entitlement profile of another node can be challenging and time-consuming. Thus, another technical challenge involves automating the key components of entitlement management.

Existing tools that calculate risk scores for nodes primarily rely on security event data and comparisons with member nodes (e.g., a group of devices, a team of individuals, or a combination thereof) and the wider organization. However, these solutions fail to capture the full extent of node risk and do not specifically address entitlement management. Hence there is a need for improved systems and methods that can effectively identify and mitigate cybersecurity risks more efficiently and accurately.

Yet another technical challenge involves quantifying node risk, focusing on entitlement management rather than solely relying on security event data. By addressing the vulnerability of nodes in terms of entitlements, a solution to this technical challenge could enhance information security of networks within organizations across various industries.

SUMMARY

The challenge of vulnerability in information security within organizations across various industries is addressed by the embodiments presented herein. Generally, aspects of the embodiments described herein, provide risk scores of nodes in a networked system that can be used to identify and remediate a threat node.

In an example embodiment, a method is for providing risk scores of nodes in a networked system. The method involves: receiving a list of entitlements for a plurality of nodes in a network; receiving a precalculated inherent risk score for each of one or more applications; receiving an organizational dataset mapping each node of the plurality of nodes to a role in the network; mapping the precalculated inherent risk score for each of the one or more applications onto a plurality of nodes entitled to execute the one or more applications, correspondingly; mapping each of the plurality of nodes to one of a plurality of peer groups using the organizational dataset, thereby generating an individual-to-peer group mapping; summing the precalculated inherent risk scores for each of the one or more applications to which a respective node of the plurality of nodes has access, thereby generating an entitled applications inherent risk score sum for the respective node; generating a mean inherent risk score total from the entitled applications inherent risk score sum for each respective node for each of the plurality of peer groups and a peer group standard deviation for each of the plurality of peer groups; generating a metric representing a number of peer group standard deviations of the respective nodes from the mean inherent risk score total of the respective peer group; transforming the metric for each of the plurality of nodes onto a scale using a cumulative distribution function, thereby generating a threat score for each respective node corresponding to all the entitlements; identifying a threat node of the plurality of nodes using the threat score of the threat node; and remediating the threat node, thereby reducing the threat score of the threat node.

In some embodiments the method further involves: grouping nodes by role, thereby generating a peer group; and calculating the number of standard deviations from the mean inherent risk score total of the peer group.

In some embodiments, remediating the threat node includes prioritizing a workload for the threat node.

In some embodiments, the method further involves determining one or more applications to which each node has access. In some embodiments, the method further involves receiving a plurality of security events associated to the plurality of nodes; and associating a priority level to each of the plurality of security events.

In some embodiments, setting one or more permissions is based, in part, on the threat score. In some embodiments, causing reassessment of the node's entitlement based, in part, on the threat score. In some embodiments, the list of entitlements contains a mapping of the plurality of nodes to the one or more applications each of the plurality of nodes is entitled to execute. In some embodiments, the role corresponds to a cost center and the node function.

In some embodiments, the method further involves: rank ordering nodes of the plurality nodes based on the threat score to prioritize risk assessment.

In another embodiments, a system for providing risk scores of nodes in a networked system, includes: a receiver configured to receive: a list of entitlements for a plurality of nodes in a network, a precalculated inherent risk score for each of one or more applications, and an organizational dataset mapping each node of the plurality of nodes to a role in the network; a mapper configured to map: the precalculated inherent risk score for each of the one or more applications onto a plurality of nodes entitled to execute the one or more applications, correspondingly, and each of the plurality of nodes to one of a plurality of peer groups using the organizational dataset, thereby generating an individual-to-peer group mapping; a calculator configured to: sum the precalculated inherent risk scores for each of the one or more applications to which a respective node of the plurality of nodes has access, thereby generating an entitled applications inherent risk score sum for the respective node, generate a mean inherent risk score total from the entitled applications inherent risk score sum for each respective node for each of the plurality of peer groups and a peer group standard deviation for each of the plurality of peer groups, and generate a metric representing a number of peer group standard deviations of the respective nodes from the mean inherent risk score total of the respective peer group; a transformer configured to transform the metric for each of the plurality of nodes onto a scale using a cumulative distribution function, thereby generating a threat score for each respective node corresponding to all the entitlements; and a threat remediator configured to: identify a threat node of the plurality of nodes using the threat score of the threat node, and remediate the threat node, thereby reducing the threat score of the threat node.

In some embodiments, the system further includes: a grouper configured to group nodes by role, thereby generating a peer group; and the calculator further configured to calculate the number of standard deviations from the mean inherent risk score total of the peer group.

In some embodiments, the system further includes: a prioritizer configured to prioritize a workload for one or more of the plurality of nodes. In some embodiments, the system further involves an access evaluator configured to determine the one or more applications to which each node has access.

In some embodiments, the receiver is further configured to receive a plurality of security events associated with the plurality of nodes; and the system further includes an associator configured to associate a priority level to each of the plurality of security events.

In some embodiments, the system further involves: a permission setter configured to set one or more permissions based, in part, on the threat score.

In some embodiments, the system further involves: a reassessor configured to cause reassessment of the node's entitlement based, in part, on the threat score.

In some embodiments, the receiver is further configured to receive a list of entitlements containing a mapping of the plurality of nodes to the one or more applications each of the plurality of nodes is entitled to execute. In some embodiments, the role corresponds to a cost center and a node function.

In yet another embodiment, there is provided a non-transitory computer-readable medium having stored thereon sequences of instructions, the sequences of instructions including instructions which when executed by one or more processors cause the one or more processors to perform the methods described herein.

BRIEF DESCRIPTION OF THE DRAWINGS

FIG. 5A illustrates a screen shot of example inherent risk and security incident response platform data, according to an example use case.

FIG. 5B illustrates an example screenshot of output according to a method for providing risk scores of nodes in a networked system.

DETAILED DESCRIPTION

Generally, aspects of the embodiments described herein pertain to a system and method for assessing and prioritizing risk scores of nodes within a networked system.

Figure 1:
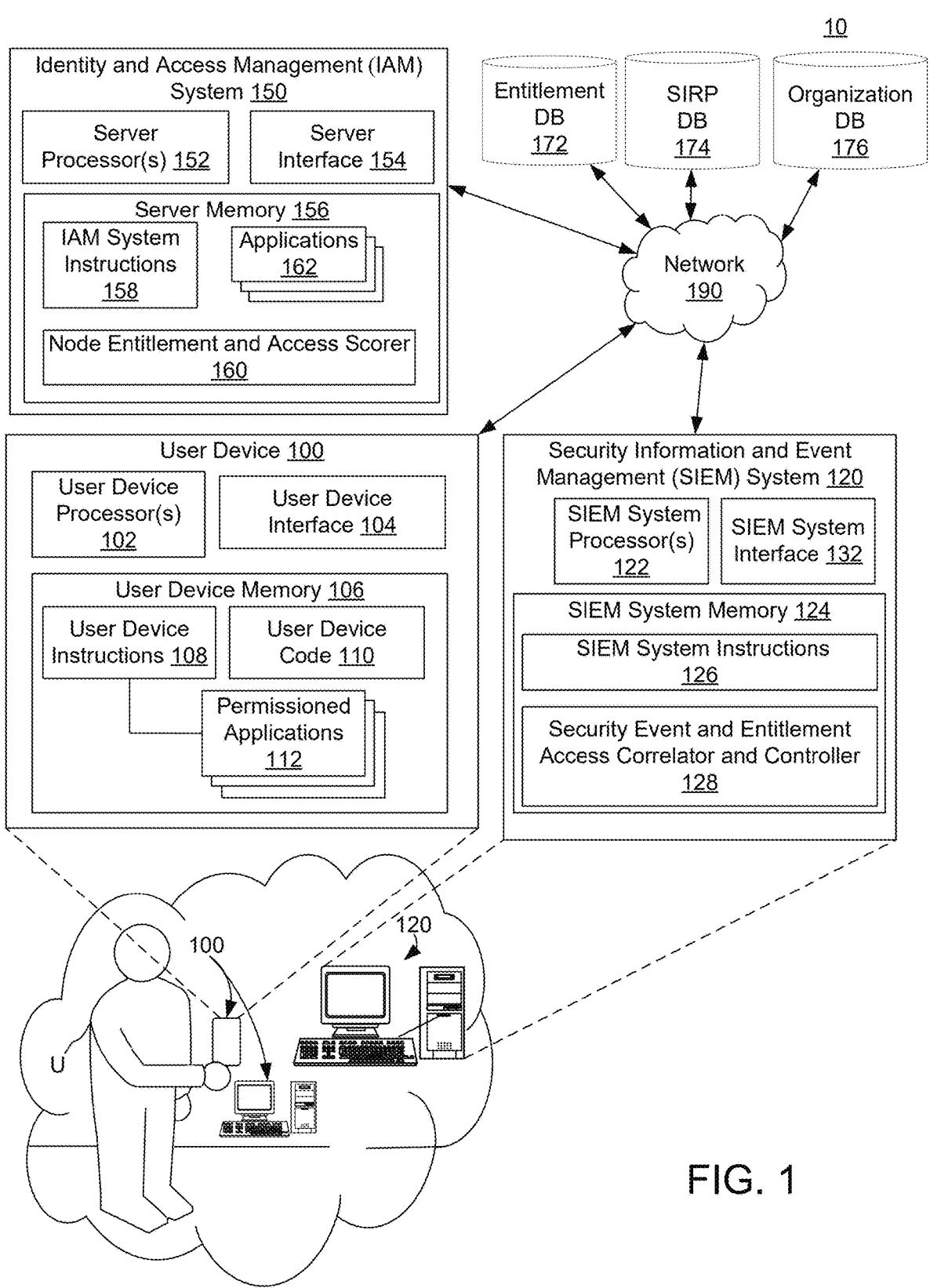
FIG. 1 shows a high-level system for providing risk scores of nodes in a networked system, according to an example embodiment.
Figure 6:
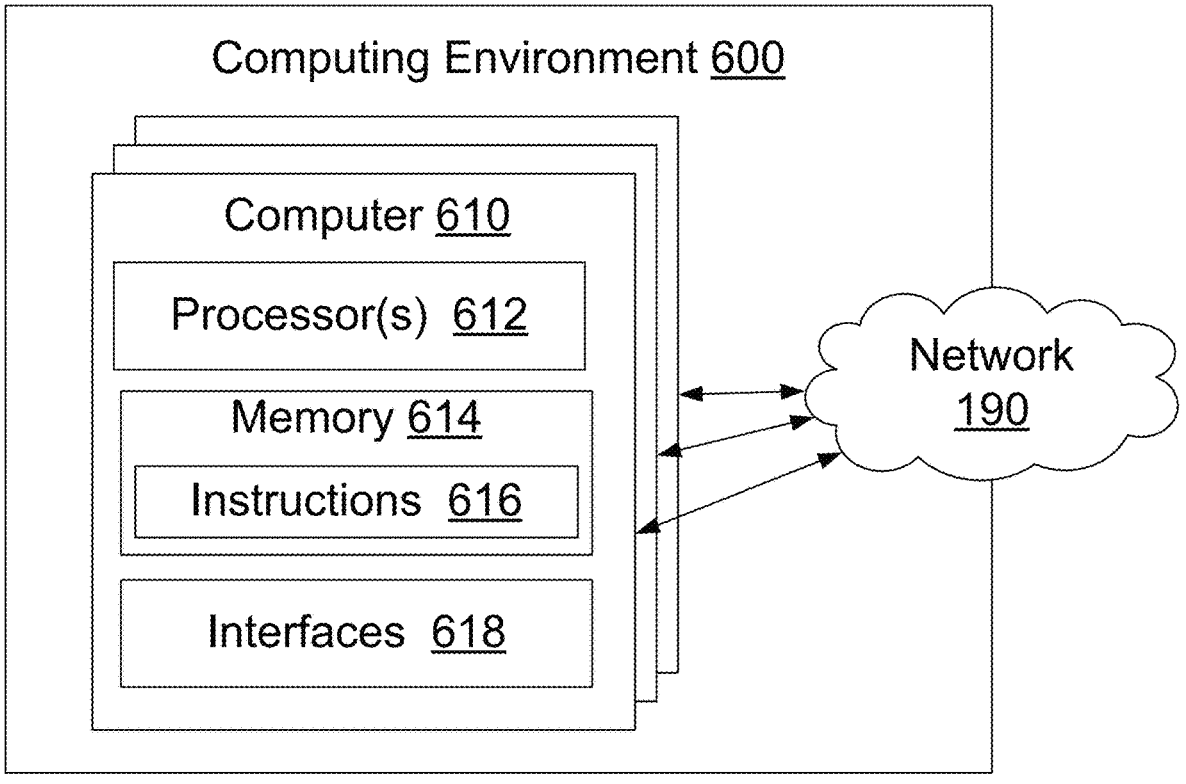
FIG. 6 discloses a computing environment in which aspects of the present disclosure may be implemented.

FIG. 1 shows a high-level system 10 for providing risk scores of nodes in a networked system, according to an example embodiment. FIG. 6 discloses a computing environment in which aspects of the present disclosure may be implemented.

The system 10 includes a user device 100, a security information and event management (SIEM) system 120, and an identity and access management (IAM) system 150, each of which is connected to a network 190.

The user device 100 is a device used by a user U that can be used as part of processes described herein. The user device 100 can include one or more aspects described elsewhere herein such as in reference to system 10 of FIG. 1. In many examples, the user device 100 is a personal computing device, such as a smart phone, tablet, laptop computer, or desktop computer. But the user device 100 need not be so limited and may instead encompass other devices used by a user as part of processes described herein. In the illustrated example, the user device 100 can include one or more user device processors 102, one or more user device interfaces 104, and user device memory 106, among other components.

The one or more user device processors 102 are one or more components of the user device 100 that execute instructions, such as instructions that obtain data, process the data, and provide output based on the processing. The one or more user device processors 102 can include one or more aspects described below in relation to the one or more processors 612 of FIG. 6.

The one or more user device interfaces 104 are one or more components of the user device 100 that facilitate receiving input from and providing output to something external to the user device 100. The one or more user device interfaces 104 can include one or more aspects described below in relation to the one or more interfaces 618 of FIG. 6.

The user device memory 106 is a collection of one or more components of the user device 100 configured to store instructions and data for later retrieval and use. The user device memory 106 can include one or more aspects described below in relation to the memory 614 of FIG. 6. As illustrated, the user device memory 106 stores user device instructions 108 and the user device code 110.

The user device instructions 108 are a set of instructions that, when executed by one or more of the one or more user device processors 102, cause the one or more user device processors 102 to perform an operation described herein. In examples, the user device instructions 108 can be those of an application (e.g., that may be obtained from an internal organization software center, or an application store such as the APPLE APP STORE or the GOOGLE PLAY STORE). The application can provide a user interface for receiving user input from a user and acting in response thereto. The user interface can further provide output to the user. In some examples, the user device instructions 108 are instructions that cause a web browser of the user device 100 to render a web page associated with a process described herein. The web page may present information to the user and be configured to receive input from the user and take actions in response thereto.

In some embodiments, user device 100 has one or more permissioned applications 112 installed, e.g., stored in user device memory 106. In some embodiments, user device 100 executes the one or more permissioned applications that are run on the cloud, on an edge device, on a server of the organization, and the like. In an example, a user device 100 includes a web browser application usable to access a web site or other cloud-based permissioned application. For simplicity, permissioned applications 112 in the cloud, on an edge device, in IAM system 150 or elsewhere on system 10 are also referred to as permissioned applications 112. A "permissioned application" as used herein refers to a software application or a software application provisioned by a system that restricts access to and functionality of itself or another application based on predefined user roles, permissions, or entitlements. These applications can enforce access controls to ensure that nodes can only perform actions or view information with authorization based on assigned permissions.

Security Information and Event Management (SIEM) system 120 is a system that combines security information management (SIM) and security event management (SEM) to provide real-time analysis of security alerts generated by network hardware and applications. SIEM systems collect, normalize, and analyze log data from various sources across an organization's IT infrastructure to detect, manage, and respond to potential security threats and incidents. This helps organizations monitor and improve their security posture by identifying suspicious activities, ensuring compliance with regulatory requirements, and facilitating incident response. In the illustrated example, SIEM system 120 includes one or more SIEM system processors 122, SIEM system memory 124, and SIEM system device interface 132.

The one or more SIEM system processors 122 are one or more components of the SIEM system 120 that execute instructions, such as instructions that obtain data, process the data, and provide output based on the processing. The one or more SIEM system processors 122 can include one or more aspects described below in relation to the one or more processors 612 of FIG. 6.

The SIEM system memory 124 is a collection of one or more components of the SIEM system 120 configured to store instructions and data for later retrieval and use. The SIEM system memory 124 can include one or more aspects described below in relation to the memory 614 of FIG. 6. The SIEM system memory 124 can store SIEM system instructions 126. The SIEM system memory 124 also can store a security event and entitlement access correlator and controller 128 that is used in conjunction with SIEM system instructions 126.

SIEM system instructions 126 and security event and entitlement access correlator and controller 128 are instructions that, when executed by the one or more processors 122, cause the one or more SIEM system processors 122 to perform one or more operations described elsewhere herein.

The one or more SIEM system interfaces 132 are one or more components of the SIEM system 120 that facilitate receiving input from and providing output to something external to the SIEM system 120. The one or more SIEM system interfaces 132 can include one or more aspects described below in relation to the one or more interfaces 618 of FIG. 6.

The IAM (Identity and Access Management) system 150 is a server device that functions as part of one or more processes described herein. In the illustrated example, the IAM system 150 includes one or more IAM system processors 152, one or more IAM system interfaces 154, and IAM system memory 156, among other components. IAM system 150 is, generally, responsible for managing user identities, roles, and access rights. IAM system 150 further operates to provision and de-provision user access to applications and resources based on entitlements and policies.

The one or more IAM system processors 152 are one or more components of the IAM system 150 that execute instructions, such as instructions that obtain data, process the data, and provide output based on the processing. The one or more IAM system processors 152 can include one or more aspects described below in relation to the one or more processors 612 of FIG. 6.

The one or more IAM system interfaces 154 are one or more components of the IAM system 150 that facilitate receiving input from and providing output to something external to the IAM system 150. The one or more IAM system interfaces 154 can include one or more aspects described below in relation to the one or more interfaces 618 of FIG. 6.

The IAM system memory 156 is a collection of one or more components of the IAM system 150 configured to store instructions and data for later retrieval and use. The IAM system memory 156 can include one or more aspects described below in relation to the memory 614 of FIG. 6. The IAM system memory 156 can store IAM system instructions 158. The IAM system memory 156 also can store applications 162 that are provided to or accessed by user device 100. In some embodiments, IAM system 150 provides access to the applications 162 under the control of SIEM system 120. As such IAM system 150 and SIEM system 120 cooperate to provision permissioned applications 112 to user device 100 according to aspects described below. The IAM system memory 156 also can store instructions that cause the IAM system processors 152 to operate as a node entitlement and access scorer 160 to perform the analysis that generates rank ordering nodes of a plurality nodes based on the threat score to prioritize risk assessment analysis.

The IAM system instructions 158 are instructions that, when executed by the one or more IAM system processors 152, cause the one or more IAM system processors 152 to perform one or more operations described elsewhere herein.

The network 190 is a set of devices that facilitate communication from a sender to a destination, such as by implementing communication protocols. Example networks 190 include local area networks, wide area networks, intranets, or the Internet.

System 10 also can include an entitlement database 172, a software inherent risk profile (SIRP) database 174, and an organization database 176, in communication via network 190. In this example implementation, IAM system 150 and SIEM system 120 can query entitlement database 172, SIRP database 174, and organization database 176 using queries generated according to the embodiments described herein.

Referring to both FIG. 1 and FIG. 6, in some embodiments, user device memory 106, SIEM system memory 124, IAM system memory 156 and memory 614 are non-transitory memory.

Also, in some embodiments, SIEM instructions 126, security event and entitlement access correlator and controller 128 can be incorporated into IAM system 150, as can entitlement database 172, SIRP database 174, and organization database 176.

Figure 2:
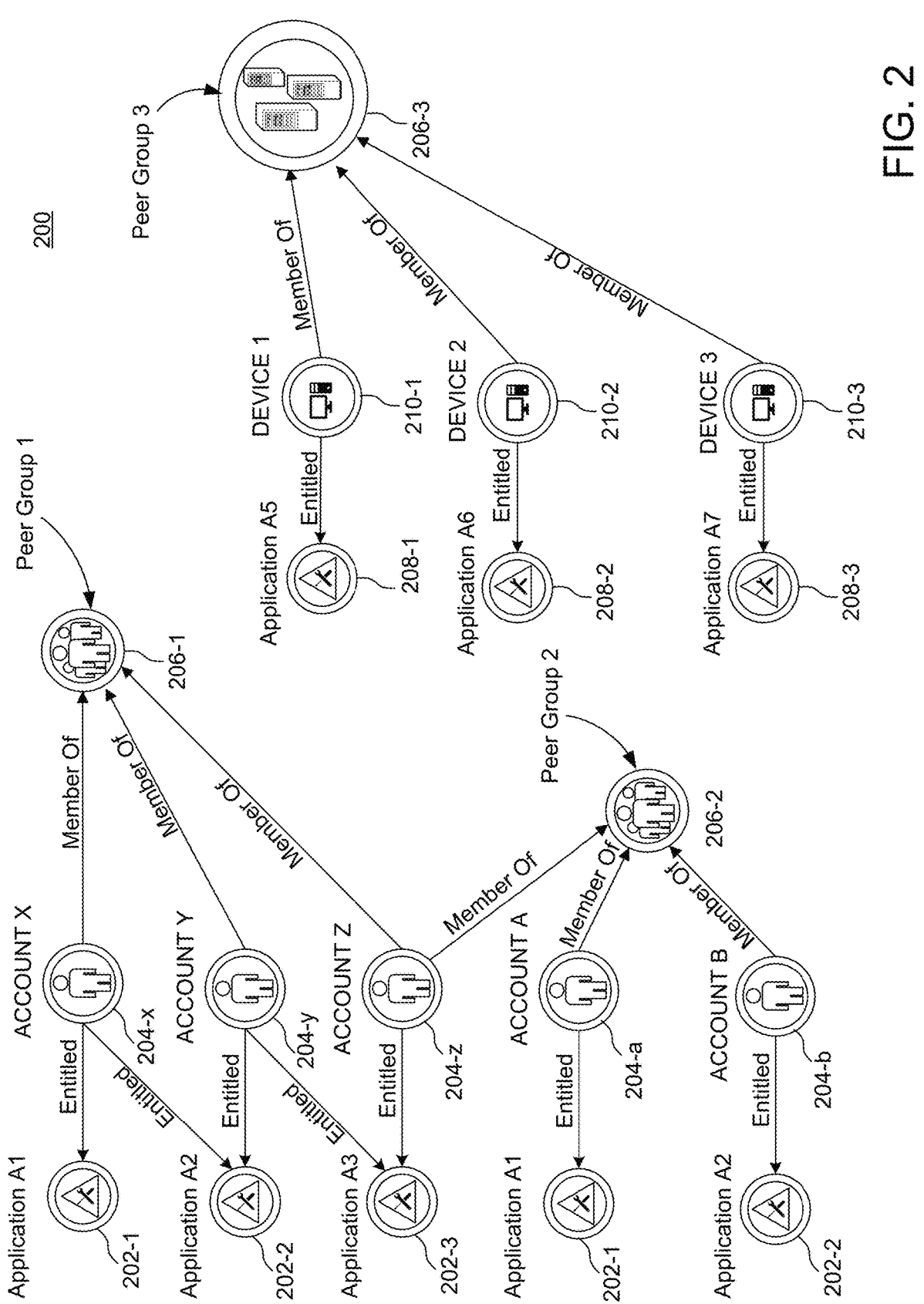
FIG. 2 illustrates an example network graph that provides a visual representation of an organizational network structure and the relationships between different nodes within the organizational network, according to an example use case.

FIG. 2 illustrates an example network graph 200 that provides a visual representation of an organizational network structure and the relationships between different nodes within the organizational network, according to an example use case. Nodes can refer to any addressable device, endpoint, or even an account associated with an individual within its network that can interact with other devices, systems, applications or users. Nodes can refer to active entities that interact with other devices, systems, applications, or users in a network. These nodes encompass devices, application endpoints, individuals, mobile devices, IoT devices, network equipment, printers, cloud services, and more. Each node can be assigned attributes, such as a specific role that encompasses its function, cost center, permissions, and access rights within the network.

In this context, a network can also refer to an organization, wherein the organization itself is viewed as a network of interconnected nodes. In this context, nodes can represent various departments, teams, or individual employees within the organization. Just as in a technical network, these organizational nodes interact, share resources, and communicate to achieve common goals. The roles assigned to these nodes within the organizational network include their job functions, departmental affiliations, access permissions to different information systems, and their responsibilities within various projects or initiatives.

The utilization of roles allows for efficient management and security of the network infrastructure. Nodes associated with similar responsibilities and access requirements are grouped together, enabling consistent policy enforcement, resource allocation, and collaborative tasks. By categorizing nodes into roles, organizations can streamline entitlement management, enforce security policies, and effectively manage their network.

Within a network of nodes, there can be peer groups. A "peer groups" as used herein, generally refers to a collection of nodes that share common characteristics, roles, functions, or access levels within the network. Peer groups facilitate various network-related activities. For example, with respect to access control and entitlement management, nodes within a peer group can be assigned similar entitlements or access rights based on shared characteristics. This simplifies managing permissions and ensures consistent security policies across similar nodes.

In another example involving network segmentation, peer groups can be utilized to segment the network, enhancing security and performance. For instance, devices within the same department may be on the same subnet, isolating their traffic from other parts of the network.

In yet another example involving policy enforcement, security policies can be uniformly enforced across nodes within a peer group, ensuring adherence to standards and protocols.

Another example involves, monitoring and management, where the concept of peer groups simplify network monitoring and management by allowing administrators to focus on groups of similar nodes rather than individual nodes. This improves issue identification and resolution efficiency.

Grouping similar nodes helps assess and manage risks, as nodes within a peer group are likely to face similar threats and vulnerabilities.

Referring to FIG. 2, node 204-x, node 204-y, node 204-z, node 204-a, and node 204-b are individuals who are members of an organizational network. Node 204-x, node 204-y, and node 204-z are members of a particular peer group, peer group 1 (206-1). Node 204-z, node 204-a, and node 204-b are members of peer group 2 (206-2). Accordingly, in an example use case, a node (e.g., node 204-z) can be a member of one or more peer groups (e.g., peer group 206-1 and peer group 206-2). As illustrated in the network graph 200, individuals can be entitled to use particular applications, where the individuals are represented as nodes and the applications are represented as application endpoints. In the example use case shown in FIG. 2:

Account X, represented as node 204-x, is entitled to use applications A1 and A2, represented by application endpoint 202-1.

Account Y, represented as node 204-y, is entitled to use application A2 and A3, represented by application endpoint 202-2.

Account Z, represented as node 204-z, is entitled to use application A3, represented by application endpoint 202-3.

Account A, represented as node 204-a, is entitled to use application A1, represented by application endpoint 202-1.

Account B, represented as node 204-b, is entitled to use application A2, represented by application endpoint 202-2.

Referring still to FIG. 2, devices can be represented by nodes and those nodes can be members of one or more peer groups. Similarly, the devices are entitled to execute certain applications. In the example shown:

Node 210-1 represents a first device (Device 1).

Node 210-2 represents a second device (Device 2).

Node 210-3 represents a third device (Device 3).

Device 1, represented by node 210-1, Device 2, represented by node 210-2, and Device 3, represented by node 210-3, are members of peer group 3 (206-3). In this example use case, the first device (Device 1), the second device (Device 2), and the third device (Device 3) are entitled to execute:

Device 1, represented as Node 210-1, is entitled to use application A5, represented by application endpoint 208-1.

Device 2, represented as Node 210-2, is entitled to use application A6, represented by application endpoint 208-2.

Device 3, represented as Node 210-3, is entitled to use application A7, represented by application endpoint 208-3.

In the context of application entitlement, a Centralized Application Repository (CAR) identifier (ID). A CAR ID is a unique identifier assigned to a specific application. In some examples a dataset or database can store a role within an organization's entitlement management system. An organization dataset helps to identify and distinguish different roles associated with applications, allowing for effective management and control of user access and permissions. CAR IDs can be used to streamline and automate entitlement processes, ensuring that users only have access to the resources and functionalities that are necessary for their role and responsibilities within the organization. An application is associated with a CAR ID.

In some embodiments, there are so-called information risk score values assigned to different applications within a system. Each application within the organizational network includes an application identifier, which is a unique identifier or code assigned to each application within the organizational network that identifies and differentiates applications from one another. In addition, the information risk score values are associated with a name parameter that contains alphanumeric characters that refers to the name or label given to each application. It is typically a human-readable description that helps users easily recognize and refer to specific applications. In addition, information risk score values include a risk score that indicates a level of risk associated with each application. The risk score can be a numerical value or a categorization that represents the potential impact, vulnerabilities, and threats associated with the application in terms of information security. A higher risk score indicates a higher level of risk and potential security concerns. This score helps organizations prioritize their security efforts, allocate resources effectively, and implement appropriate security measures for each application.

Figure 3:
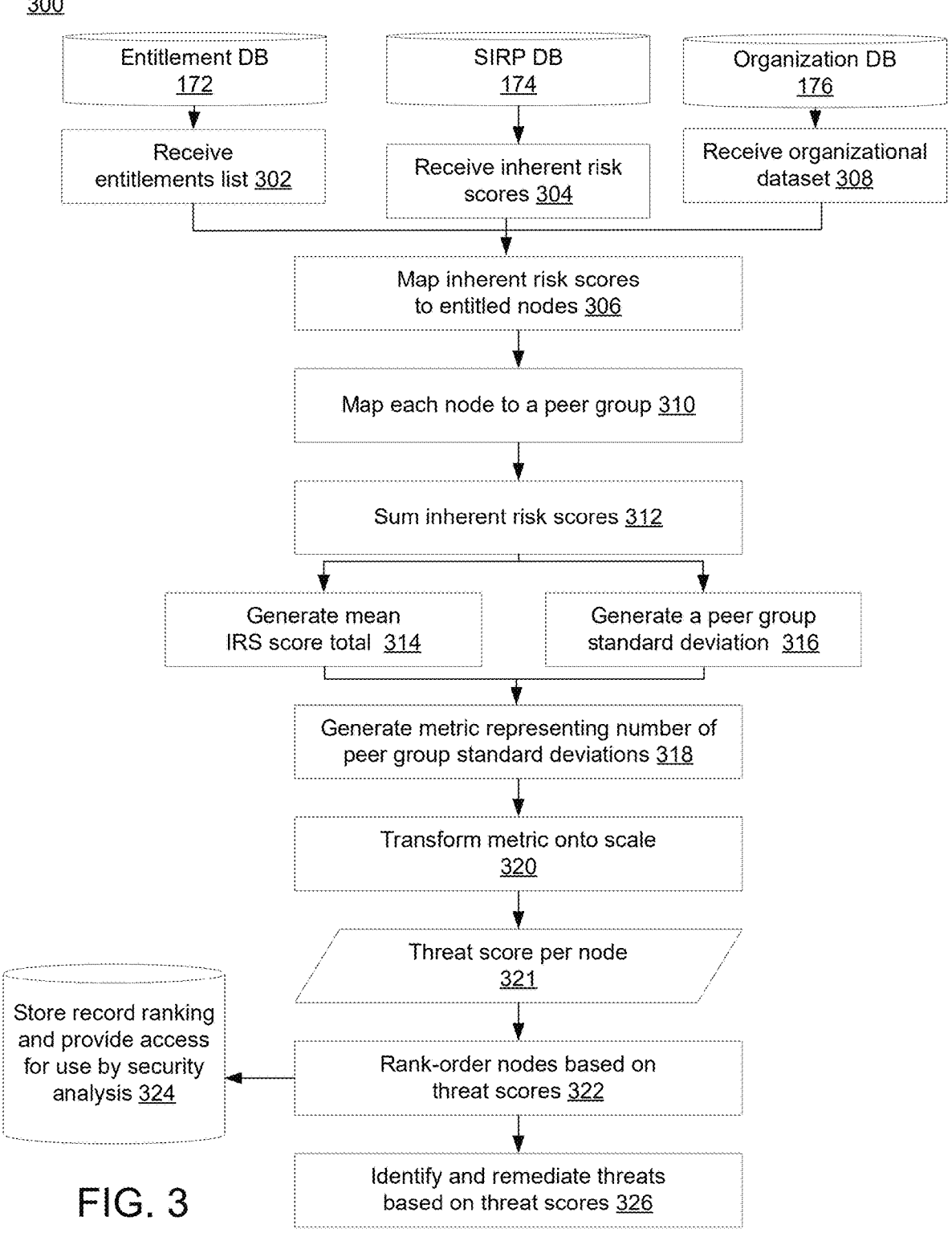
FIG. 3 illustrates a method for providing risk scores of nodes in a networked system, according to an example embodiment.

FIG. 3 illustrates a method 300 for providing risk scores of nodes in a networked system, according to an example embodiment. In an example embodiment, IAM system 150 performs a method for providing risk scores of nodes in a networked system. Initially, an entitlement receive operation 302 performs receiving a list of entitlements for a plurality of nodes in the network. A list of entitlements maps the entitlements to the applications that each node is permitted to execute. An entitlement dataset stored in entitlements database 172 is a collection of data that maps the entitlements of nodes in a network to the applications they are entitled to use. It contains information regarding the specific permissions and access rights granted to each node within the network. The entitlement dataset typically includes a mapping of the nodes to the corresponding applications, specifying which applications each node is authorized to execute or use. In addition or instead, entitlement dataset can specify an amount of access or authorization a node has with respect to an application or resource. For example, one node may have read-only access to a resource (e.g., file) but another node may have read-write access to that same resource. In another example, one node may have unilateral authority to take an action but another may require bilateral authority (e.g., require the permission or approval of another to proceed). In some embodiments, the entitlements dataset in entitlements database 172 is used in the context of assessing and prioritizing risk scores of nodes in the network, allowing for the calculation of entitled applications inherent risk score sums for each node and determining the overall threat level based on all entitlements.

Additionally, an inherent risk score values receive operation 304 performs receiving information risk score values associated with these applications, resources, or a level of access associated therewith. In an example implementation, the risk scores contained in the inherent risk score values are precalculated. A precalculated inherent risk score is referred to as a precalculated inherent risk score or precalculated risk score. For instance, having read-only access to a resource may have a first inherent risk score value and having read-write access to that same resource may have a second inherent risk score value higher than the first. While many examples are described in the context of inherent or predetermined risk scores, in some examples there may be dynamic risk scores. For instance, rather than each entitlement having a fixed risk score, the risk score may dynamically change based on other entitlements or attributes of a same node. For instance, a node having an entitlement that provides the ability to download information from a database may normally be associated with a first risk score, but that same entitlement may have a second, higher risk score if the node also has access to one or more file upload sites. In an example, some entitlements or attributes are associated with a risk multiplier value that increases the risk scores of other attributes or entitlements held by the node by that multiplier value. In some examples, attributes or entitlements may be associated with lower levels of risk. For instance, a node having an entitlement that provides the ability to access private information may have a first risk score, but that same entitlement may have a second, lower risk score if the node is associated with training regarding safe handling of private information.

A SIRP (Software Inherent Risk Profile) database 174 provides precalculated inherent risk scores associated with different software applications or different features of different software applications. SIRP database 174 includes data points such as the unique ID of each application, the name of the application (e.g., MICROSOFT WORD), and the corresponding precalculated inherent risk score assigned to the application. The SIRP dataset stored in SIRP database 174 helps in mapping the precalculated inherent risk scores onto the entitled nodes based on their access permissions to the applications. The SIRP dataset also serves as a reference for calculating additional risk scores. In addition, SIRP dataset also serves as a reference for determining the overall threat level for each node in the network.

The precalculated inherent risk scores for each application are then mapped onto the entitled nodes, correspondingly, as shown by map inherent scores to entitlement nodes operation 306. This mapping ensures that each node is associated with the appropriate precalculated inherent risk score based on its access permissions. For instance, for each respective application or resource that a respective node has at least some level of access to (e.g., as determined based on the entitlements list associated with the node), a corresponding mapping is made to the respective node. Other techniques may also be used.

An organizational dataset receive function 308 performs receiving an organizational dataset from an organization database 176. Organizational dataset maps each node to one or more roles in the network. The organizational dataset can include information such as an identifier associated with the respective node, a cost center associated with the respective node, and a node function associated with the respective node, among other data. By using this organizational dataset, an individual-to-peer group mapping operation 310 performs mapping each node to one of a plurality of peer groups, generating an individual-to-peer group mapping.

To calculate risk scores, an inherent risk score summing operation 312 sums the precalculated inherent risk scores for each application, resource, and access level associated with a respective node, resulting in an entitled applications inherent score sum for that respective node.

A mean inherent score total operation 314 performs generating a mean inherent score total for each respective node within each peer group. This mean inherent score total represents the average risk score total for the applications to which the node has access.

A peer group standard deviation operation 316 performs calculating a peer group standard deviation. This standard deviation quantifies the variation in inherent risk scores within each peer group.

A metric generation operation 318 performs generating a metric representing the number of peer group standard deviations by which each node deviates from the mean inherent risk score total of its respective peer group. This metric serves as a measure of the node's deviation from the average risk level within its peer group.

A transform operation 320 performs transforming the metric onto a scale (e.g., a 0-1 scale) using a cumulative distribution function, such as the Gamma Distribution Function. This transformation generates a threat score 321 for each node, representing the overall risk (e.g., relative to the other nodes of an associated grouping of nodes) based on all its entitlements.

A rank-order operation 322 performs rank-ordering the nodes based on their threat scores to prioritize risk assessment analysis. This ranking allows for the identification of nodes with higher risk levels, enabling focused attention on critical areas. The rankings based on the rank ordering can be stored and provided to a security analyzer operable to perform a security analysis as shown by block storing operation 324.

In some embodiments, the method further involves grouping nodes by their role, generating a peer group. Within each peer group, the number of standard deviations from the mean inherent risk score total is calculated. This calculation provides a measure of the node's deviation from the average risk level within its peer group.

In some embodiments, the method further involves determining the applications to which each node has access. This information aids in accurately calculating the entitled applications inherent risk score sum for each node. Further, in some embodiments, the method further involves receiving a plurality of security events associated with the plurality of nodes. Each security event is associated with a priority level, allowing for the prioritization of security event handling based on the threat scores.

The method can further involve setting one or more permissions based, in part, on the threat score. The threat score serves as a factor in determining the appropriate permissions for each node, enhancing security measures. In addition, in some embodiments, the method further involves causing reassessment of the node's entitlement based, in part, on the threat score. The threat score influences the need for reevaluating and adjusting the entitlements of each node to mitigate risks effectively.

The method may further involve using a list of entitlements that contains a mapping of the plurality of nodes to the one or more applications that each node is entitled to execute. This mapping ensures accurate calculation and mapping of precalculated inherent risk score to the entitled nodes.

In some embodiments, the method further involves mapping the role of each node to a cost center and a node function. This correspondence allows for a comprehensive understanding of the role and function of each node within the networked system.

In an example embodiment, a risk score distribution is generated by identifying nodes with the same node function. The system collects nodes that share the same node function, even if they are spread across different organizational units. These nodes are considered part of the same peer group.

An organizational unit can encompass various entities such as groups of computers, devices, and/or individuals. In the context of computer networks and information technology, an organizational unit refers to a logical or physical grouping of resources. This grouping can include computers, servers, devices, or any other network components.

In the context of individuals who are part of teams or branches within the organizational unit, an organizational unit refers to a logical or physical grouping that encompasses these teams or branches. An organizational unit serves as a way to organize and manage individuals within the organization based on specific criteria such as department, location, function, or security requirements. It provides a framework for structuring and coordinating the activities of teams or branches, ensuring effective communication, collaboration, and resource allocation. Additionally, the organizational unit may also include groups of computers or network devices that support the operations of these teams or branches.

In turn, each node within the peer group has a total risk score associated with it. For example, referring to FIG. 2, node 204-x, representing ACCOUNT X, may have a threat score of SCORE_1, node 204-y, representing ACCOUNT Y, may have a threat score of SCORE_2, and so on. These threat scores represent the distribution of risk scores within the peer group. Within each peer group, the system then calculates the mean risk score. The mean represents the average risk score for the nodes within the peer group. Additionally, the system calculates the standard deviation (SD) for the peer group. The standard deviation quantifies the variation or spread of risk scores within the group. In turn, for each node within the peer group, the system calculates how many standard deviations they are from the mean risk score of the peer group. This calculation helps determine the distance of each node's risk score from the average risk score of their peer group.

The number of standard deviations from the mean is used to assess the significance of a node's risk score within their peer group. A standard deviation close to zero indicates that the node's risk score aligns with the expected average for their peer group. Conversely, a larger number of standard deviations indicates that the node's risk score deviates further from the peer group's average, suggesting a higher or lower risk level compared to their peers. By executing the above operations, the system generates a risk score distribution that reflects the variation in risk scores among nodes within their respective peer groups.

An identification and remediation operation 326 includes identifying threat nodes or risks based on the threat scores and remediating the identified threat node.

In some examples, identifying threats can include identifying nodes having a risk score that passes a risk threshold as a threat node. In some examples, the identifying can include using a statistical analysis. The identifying can include using the standard deviations or the significance of the node's risk score as discussed above.

The remediation can include any of a variety of operations to ameliorate the risk of the identified nodes. This can include increasing an amount of scrutiny given to the identified node (e.g., increasing a frequency of security checks, allocating additional security resources to monitoring network activity of the node, adding the node to a threat list, other actions, or combinations thereof). The remediation can include prioritizing the workload for one or more of the plurality of nodes. This prioritization allows for efficient allocation of resources (e.g., for remediation) and attention to nodes with higher risk levels. Remediation can include increasing scrutiny of security events associated with the threat node (e.g., increasing priority of security events associated with the threat node). The remediation can include revoking access by the node or other actions (e.g., contacting a manager associated with the node regarding the heightened risk associated with the node).

Figure 4:
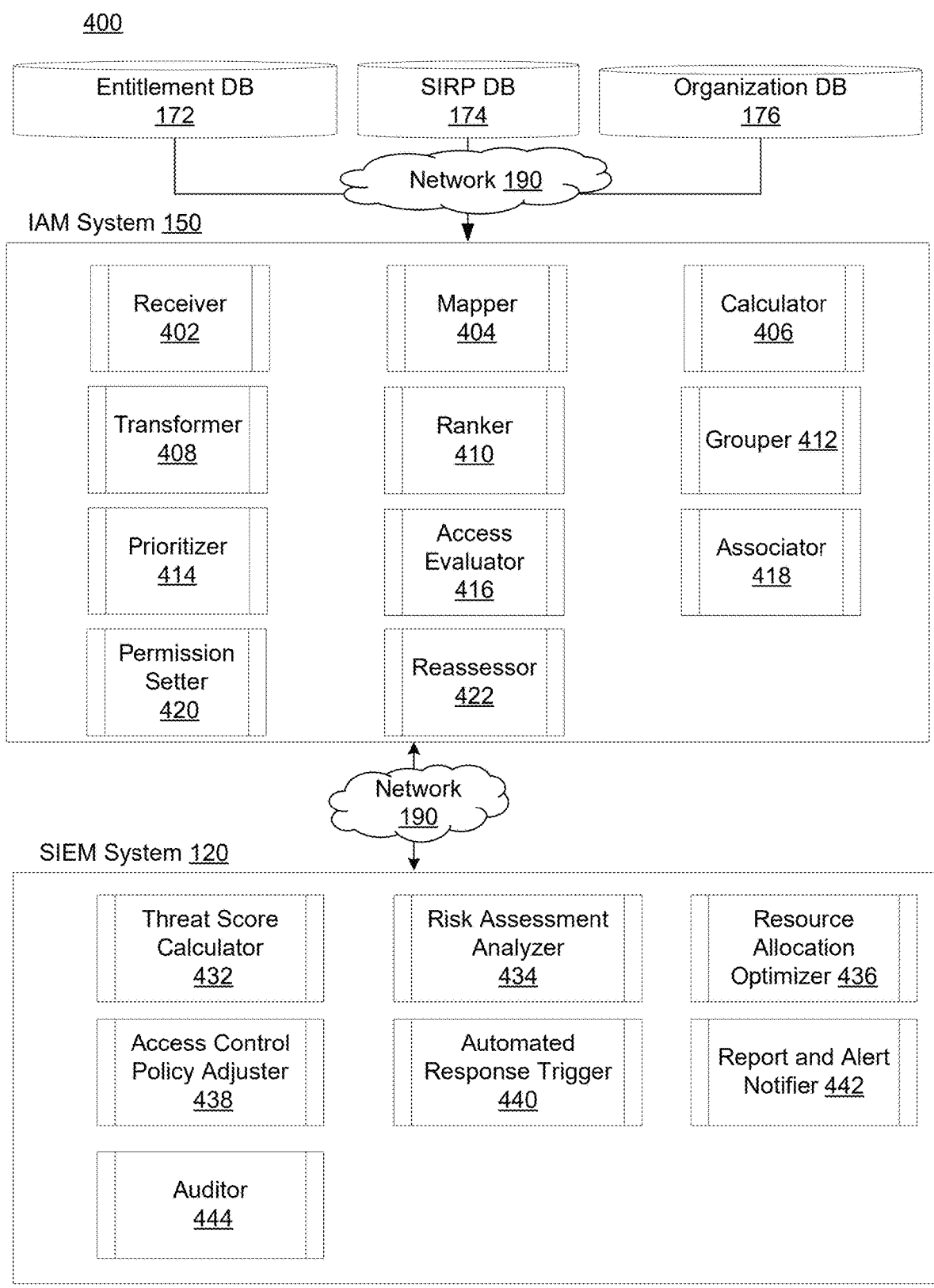
FIG. 4 illustrates a system for providing risk scores of nodes in a networked system, according to an example embodiment.

FIG. 4 illustrates a system 400 for providing risk scores of nodes in a networked system, according to an example embodiment. In some embodiments, a system 400 is configured for providing risk scores of nodes in a networked system. As illustrated, the system 400 includes a receiver 402, a mapper 404, a calculator 406, a transformer 408, a ranker 410, a grouper 412, a prioritizer 414, an access evaluator 416, an associator 418, a permission setter 420, and a reassessor 422.

The receiver 402 is configured to receive a list of entitlements for a plurality of nodes in a network, a precalculated inherent risk score for each of one or more applications (e.g., application 162 of FIG. 1), and an organizational database 176 containing an organizational dataset mapping each node of the plurality of nodes to a role in the network. In an example embodiment, the list of entitlements is obtained from an entitlement dataset stored in entitlement database 172, the precalculated inherent risk scores are obtained from an SIRP dataset stored in SIRP database 174, and the organizational dataset is obtained from an organization database 176.

The mapper 404 is configured to map the precalculated inherent risk score for each of the one or more applications onto a plurality of nodes entitled to execute the one or more applications (e.g., applications 162 of FIG. 1) correspondingly, and to map each of the plurality of nodes to one of a plurality of peer groups using the organizational dataset, thereby generating an individual-to-peer group mapping.

The calculator 406 is configured to sum the precalculated inherent risk scores for each of the one or more applications to which a respective node of the plurality of nodes has access, thereby generating an entitled applications inherent risk score sum for the respective node. The calculator 406 also generates a mean risk score total from the entitled applications risk score sum for each respective node for each of the plurality of peer groups and a peer group standard deviation for each of the plurality of peer groups. Additionally, the calculator 406 generates a metric representing a number of peer group standard deviations of the respective nodes from the mean inherent risk score total of the respective peer group.

The transformer 408 is configured to transform the metric for each of the plurality of nodes onto a scale (e.g., decimal values between 0 and 1, inclusive) using a cumulative distribution function, thereby generating a threat score for each respective node corresponding to all the entitlements.

The ranker 410 is configured to rank order nodes of the plurality of nodes based on the threat score to prioritize risk assessment analysis.

The grouper 412 is configured to group nodes by role, thereby generating a peer group. The calculator 406 is further configured to calculate the number of standard deviations from the mean inherent risk score total of the peer group.

The prioritizer 414 is configured to prioritize a workload for one or more of the plurality of nodes.

The access evaluator 416 is configured to determine the one or more applications to which each node has access.

The associator 418, which is configured to associate a priority level to each of the plurality of security events, with the receiver 402 further configured to receive a plurality of security events associated with the plurality of nodes.

The permission setter 420 is configured to set one or more permissions based, in part, on the threat score.

The reassessor 422 is configured to cause reassessment of the node's entitlement based, in part, on the threat score. The receiver 402 can be further configured to receive a list of entitlements containing a mapping of the plurality of nodes to the one or more applications each of the plurality of nodes is entitled to execute.

The SIEM system 120 of FIG. 1 can use the threat scores to enhance its capability to detect, analyze, and respond to security threats within the network, ensuring a more proactive and targeted approach to cybersecurity management. SIEM system 120 particularly can be used to leverage the generated threat scores and rank ordering to enhance security monitoring and incident response in several ways by using the threat scores to rank nodes, enabling the prioritization of risk assessment analysis. Nodes with higher threat scores would be flagged for immediate attention and more rigorous monitoring. Additionally, the SIEM system 120 could optimize resource allocation by focusing on high-risk nodes, dedicating more monitoring efforts, applying stricter access controls, or scheduling more frequent security audits.

The threat scores would also inform access control policies, allowing the SIEM system 120 to adjust permissions or implement stricter verification processes for nodes with higher scores. Automated responses could be triggered based on these scores, such as isolating a high-risk node from the network or requiring multi-factor authentication for access. Furthermore, the SIEM system 120 would generate detailed reports and real-time alerts, notifying security teams about nodes that exceed certain risk thresholds and prompting immediate investigation.

In addition, the SIEM system would support compliance and auditing by documenting the threat scores and the corresponding security measures taken, thereby maintaining regulatory compliance and providing a clear audit trail.

Referring to FIG. 4, SIEM system 120, in some embodiments, includes a threat score calculator 432, a risk assessment analyzer 434, a resource allocation optimizer 436, an access control policy adjuster 438, an automated response trigger 440, a report and alert notifier 442, and an auditor 444.

The threat score calculator 432 calculates threat scores for different nodes within the network based on various factors such as the severity of security events, historical data, and vulnerability assessments. The threat scores calculated as described herein are used to prioritize risk assessment analysis and identify nodes that require immediate attention.

The risk assessment analyzer 434 utilizes the threat scores to analyze the level of risk associated with each node in the network. Analyzing the level of risk associated with each node in the network provides insights into the potential impact of security threats and helps security teams determine the appropriate response, mitigation strategies, and entitlement assessments.

The resource allocation optimizer 436 is included in some embodiments to use the threat scores to optimize resource allocation within the SIEM system 120. In an example implementation, resource allocation optimizer 436 operates to identify high-risk nodes and allocate more monitoring efforts, stricter access controls, and frequent security audits to ensure their protection.

The access control policy adjuster 438 uses the threat scores to adjust access control policies for different nodes. Access control policy adjuster 438 can operate to automatically implement stricter verification processes or require multi-factor authentication for nodes with higher threat scores, enhancing the overall security posture of the organization.

The automated response trigger 440, in some embodiments, is included to trigger automated responses based on the threat scores. Automated response trigger 440 thus operates to enable and/or perform actions such as restricting entitlements, isolating high-risk nodes from the network or initiating multi-factor authentication for access, ensuring immediate protection against potential security threats.

The report and alert notifier 442 can be included as well within SIEM system 120 to generate detailed reports and real-time alerts based on the threat scores. The report and alert notifier 442 can operate to notify security teams about nodes that exceed certain risk thresholds, prompting immediate investigation and response.

The auditor 444 operates to document the threat scores and the corresponding security measures taken, ensuring compliance with regulatory requirements. The auditor 444 operates to provide a clear audit trail, helping organizations demonstrate their adherence to security standards and regulations.

In some embodiments, a threat remediator operates to identify a threat node among a plurality of nodes using the threat score of the threat node and, in turn, to remediate the identified threat node, thereby reducing its threat score.

In an example implementation, reassessor 422 of IAM system 150 operates as the threat remediator. In another example implementation, automated response trigger 440 of SIEM system 120 operates as the threat remediator. In yet other embodiments, the threat remediator is an independent component remote from IAM system 150 or SIEM system 120 and in communication via network 190.

FIG. 5A illustrates an example screen shot of SIRP data, according to an example use case. As shown in FIG. 5A, the SIRP data shows a software names column 502, a CAR ID column 504, a software status column 506, an inherent risk rating column 508, a information classification column 510 and an inherent risk score column 512. The provided information describes a screenshot of SIRP data, showcasing an example use case. The screenshot, represented in FIG. 5A, displays several columns with different information related to software applications. The software name column 502 presents the names or labels of the software applications being monitored or managed within the SIRP system. Each row corresponds to a specific software application. The centralized application repository identifier (CAR ID) column 504 displays the unique identifiers assigned to each software application's role within the organization's entitlement management system. The CAR ID helps in identifying and distinguishing different roles associated with each software application. The software status column 506 indicates the current status of the software applications. It could include values such as "active," "inactive," "under maintenance," or "deprecated, providing an overview of the operational status of each application.

The inherent risk rating column 508 represents the inherent risk rating associated with each software application. The inherent risk rating assesses the potential level of risk that the application poses to the organization's information security, taking into account factors such as vulnerabilities, potential threats, and the criticality of the application.

The information classification column 510 displays the classification level or sensitivity of the information handled by each software application. It may include labels such as "confidential," "internal use only," or "public," indicating the level of protection and access controls required for the application's data.

The inherent risk score column 512 presents a numerical or categorical score that represents the overall risk level of each software application. This score combines various factors, including the inherent risk rating, the information classification, and potentially other risk assessment criteria. The inherent risk score helps in prioritizing security efforts, resource allocation, and determining the appropriate security measures for each application.

Overall, this SIRP data screenshot provides a comprehensive view of the software applications being monitored, including their names, role identifiers, status, inherent risk rating, information classification, and inherent risk score. This information aids in effective security incident response, risk management, and decision-making related to the organization's software applications.

FIG. 5B illustrates an example screenshot of output according to a method for providing risk scores of nodes in a networked system. A node ID column 522 lists the unique identifier or name of each node in the network. An entitlements column 524 shows the list of entitlements associated with each node, representing the specific permissions or access rights granted to that node. A precalculated inherent risk score column 526 displays the precalculated inherent risk score for each application, which is associated with the respective node. An organizational dataset mapping column 528 indicates the role in the network to which each node is mapped, according to the organizational dataset as well as the peer group to which each node belongs. An entitled applications inherent risk score sum column 530 represents the sum of precalculated inherent risk scores for the applications to which each node has access. It indicates the cumulative risk score associated with the entitlements granted to that node. A mean inherent risk score total column 532 displays the mean inherent risk score total calculated for each peer group. It represents the average cumulative risk score of the nodes within the respective peer group. A peer group standard deviation column 534 shows the standard deviation calculated for each peer group. It indicates the degree of variation in the cumulative risk scores among the nodes within the peer group. A metric column 536 presents a metric representing the number of peer group standard deviations that each node's cumulative risk score deviates from the mean inherent risk score total of its peer group. A transformed metric (threat score) column 538 displays the transformed metric, which is scaled onto a scale (e.g., 0-1) using a cumulative distribution function. It represents the threat score assigned to each node based on its cumulative risk score and the deviation from the mean of its peer group. A rank order column 540 shows the rank order assigned to each node based on its threat score. Nodes with higher threat scores would be prioritized for risk assessment analysis. It should be understood that the screenshot might include visual indicators such as color-coding or icons to represent the threat scores and rank order, providing a visual representation of the node's risk level relative to others in the network.

Computing Environment

FIG. 6 discloses a computing environment 600 in which aspects of the present disclosure may be implemented. A computing environment 600 is a set of one or more virtual or physical computers 610 that individually or in cooperation achieve tasks, such as implementing one or more aspects described herein. The computers 610 have components that cooperate to cause output based on input. Example computers 610 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment 600 includes at least one physical computer.

The computing environment 600 may specifically be used to implement one or more aspects described herein. In some examples, one or more of the computers 610 may be implemented as a user device, such as mobile device and others of the computers 610 may be used to implement aspects of a machine learning framework useable to train and deploy models for analyzing and using the data generated by the embodiments described herein or provide other functionality, such as through exposed application programming interfaces.

The computing environment 600 can be arranged in any of a variety of ways. The computers 610 can be local to or remote from other computers 610 of the computing environment 600. The computing environment 600 can include computers 610 arranged according to client-server models, peer-to-peer models, edge computing models, other models, or combinations thereof.

In many examples, the computers 610 are communicatively coupled with devices internal or external to the computing environment 600 via a network 190. The network 190 is a set of devices that facilitate communication from a sender to a destination, such as by implementing communication protocols. Example networks 190 include local area networks, wide area networks, intranets, or the Internet.

In some implementations, computers 610 can be general-purpose computing devices (e.g., consumer computing devices). In some instances, via hardware or software configuration, computers 610 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 610 include one or more processors 612, memory 614, and one or more interfaces 618. Such components can be virtual, physical, or combinations thereof.

The one or more processors 612 are components that execute instructions, such as instructions that obtain data, process the data, and provide output based on the processing. The one or more processors 612 often obtain instructions and data stored in the memory 614. The one or more processors 612 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 612 include at least one physical processor implemented as an electrical circuit. Example providers of processors 612 include INTEL, AMD, QUALCOMM, TEXAS INSTRUMENTS, and APPLE.

The memory 614 is a collection of components configured to store instructions 616 and data for later retrieval and use. The instructions 616 can, when executed by the one or more processors 612, cause execution of one or more operations that implement aspects described herein. In many examples, the memory 614 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 614 can store information encoded in transient signals.

The one or more interfaces 618 are components that facilitate receiving input from and providing output to something external to the computer 610, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 618 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 618 can facilitate connection of the computing environment 600 to a network 190.

The computers 610 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed:

1. A method for providing risk scores of nodes in a networked system, comprising:

receiving a list of entitlements for a plurality of nodes in a network;

receiving a precalculated inherent risk score for each of one or more applications;

receiving an organizational dataset mapping each node of the plurality of nodes to a role in the network;

mapping the precalculated inherent risk score for each of the one or more applications onto a plurality of nodes entitled to execute the one or more applications, correspondingly;

mapping each of the plurality of nodes to one of a plurality of peer groups using the organizational dataset, thereby generating an individual-to-peer group mapping;

summing the precalculated inherent risk scores for each of the one or more applications to which a respective node of the plurality of nodes has access, thereby generating an entitled applications inherent risk score sum for the respective node;

generating a mean inherent risk score total from the entitled applications inherent risk score sum for each respective node for each of the plurality of peer groups and a peer group standard deviation for each of the plurality of peer groups;

generating a metric representing a number of peer group standard deviations of the respective nodes from the mean inherent risk score total of the respective peer group;

transforming the metric for each of the plurality of nodes onto a scale using a cumulative distribution function, thereby generating a threat score for each respective node corresponding to all the entitlements;

identifying a threat node of the plurality of nodes using the threat score of the threat node; and remediating the threat node, thereby reducing the threat score of the threat node.

2. The method of claim 1, further comprising:

grouping nodes by role, thereby generating a peer group; and calculating the number of standard deviations from the mean inherent risk score total of the peer group.

3. The method of claim 1, wherein remediating the threat node includes:

prioritizing a workload for the threat node.

4. The method of claim 1, further comprising:

determining one or more applications to which each node has access.

5. The method of claim 1, further comprising:

receiving a plurality of security events associated to the plurality of nodes; and associating a priority level to each of the plurality of security events.

6. The method of claim 1, wherein setting one or more permissions is based, in part, on the threat score.

7. The method of claim 1, wherein causing reassessment of the node's entitlement based, in part, on the threat score.

8. The method of claim 1, wherein the list of entitlements contains a mapping of the plurality of nodes to the one or more applications each of the plurality of nodes is entitled to execute.

9. The method of claim 1, wherein the role corresponds to a cost center and the node function.

10. The method of claim 1, further comprising:

rank ordering nodes of the plurality nodes based on the threat score to prioritize risk assessment.

11. A system for providing risk scores of nodes in a networked system, comprising:

one or more processors;

memory storing instructions that, when executed by the one or more processors, cause the system to:

receive:

a list of entitlements for a plurality of nodes in a network, a precalculated inherent risk score for each of one or more applications, and an organizational dataset mapping each node of the plurality of nodes to a role in the network;

map:

the precalculated inherent risk score for each of the one or more applications onto a plurality of nodes entitled to execute the one or more applications, correspondingly, and each of the plurality of nodes to one of a plurality of peer groups using the organizational dataset, thereby generating an individual-to-peer group mapping;

calculate:

a sum the precalculated inherent risk scores for each of the one or more applications to which a respective node of the plurality of nodes has access, thereby generating an entitled applications inherent risk score sum for the respective node, a mean inherent risk score total from the entitled applications inherent risk score sum for each respective node for each of the plurality of peer groups and a peer group standard deviation for each of the plurality of peer groups, and a metric representing a number of peer group standard deviations of the respective nodes from the mean inherent risk score total of the respective peer group;

transform the metric for each of the plurality of nodes onto a scale using a cumulative distribution function, thereby generating a threat score for each respective node corresponding to all the entitlements; and remediate a threat node by:

identifying a threat node of the plurality of nodes using the threat score of the threat node, and remediating the threat node, thereby reducing the threat score of the threat node.

12. The system of claim 11, wherein the instructions further cause the system to:

group nodes by role, thereby generating a peer group; and calculate the number of standard deviations from the mean inherent risk score total of the peer group.

13. The system of claim 11, wherein the instructions further cause the system to:

prioritize a workload for one or more of the plurality of nodes.

14. The system of claim 11, wherein the instructions further cause the system to:

determine the one or more applications to which each node has access.

15. The system of claim 11, wherein the instructions further cause the system to:

receive a plurality of security events associated with the plurality of nodes; and associate a priority level to each of the plurality of security events.

16. The system of claim 11, wherein the instructions further cause the system to:

set one or more permissions based, in part, on the threat score.

17. The system of claim 11, wherein the instructions further cause the system to:

cause reassessment of the node's entitlement based, in part, on the threat score.

18. The system of claim 11, the instructions cause the system to receive a list of entitlements containing a mapping of the plurality of nodes to the one or more applications each of the plurality of nodes is entitled to execute.

19. The system of claim 11, wherein the role corresponds to a cost center and a node function.

20. A non-transitory computer-readable medium having stored thereon sequences of instructions, the sequences of instructions including instructions which when executed by one or more processors cause the one or more processors to perform:

receiving a list of entitlements for a plurality of nodes in a network;

receiving a precalculated inherent risk score for each of one or more applications;

receiving an organizational dataset mapping each node of the plurality of nodes to a role in the network;

mapping the precalculated inherent risk score for each of the one or more applications onto a plurality of nodes entitled to execute the one or more applications, correspondingly;

mapping each of the plurality of nodes to one of a plurality of peer groups using the organizational dataset, thereby generating an individual-to-peer group mapping;

summing the precalculated inherent risk scores for each of the one or more applications to which a respective node of the plurality of nodes has access, thereby generating an entitled applications inherent risk score sum for the respective node;

generating a mean inherent risk score total from the entitled applications inherent risk score sum for each respective node for each of the plurality of peer groups and a peer group standard deviation for each of the plurality of peer groups;

generating a metric representing a number of peer group standard deviations of the respective nodes from the mean inherent risk score total of the respective peer group;

transforming the metric for each of the plurality of nodes onto a scale using a cumulative distribution function, thereby generating a threat score for each respective node corresponding to all the entitlements;

identifying a threat node of the plurality of nodes using the threat score of the threat node; and remediating the threat node, thereby reducing the threat score of the threat node.

* * * * *